United States Patent

[11] 3,610,867

| [72] | Inventor | Peter Morley Bartle<br>Haverhill, England |
|---|---|---|
| [21] | Appl. No. | 9,744 |
| [22] | Filed | Feb. 9, 1970 |
| [45] | Patented | Oct. 5, 1971 |
| [73] | Assignee | The Welding Institute<br>Cambridge, England |
| [32] | Priority | Feb. 11, 1969 |
| [33] | | Great Britain |
| [31] | | 7333/69 |

[54] ELECTROGAS WELDING
18 Claims, 6 Drawing Figs.

[52] U.S. Cl. ............................................. 219/73,
219/126
[51] Int. Cl. ............................................. B23K 9/18,
B23k 25/00, B23K 9/12
[50] Field of Search ............................................. 219/73,
126, 70, 74

[56] References Cited
UNITED STATES PATENTS

| 2,916,605 | 12/1959 | Lucas ............................ | 219/126 |
| 2,997,571 | 8/1961 | Smout ............................ | 219/126 |
| 3,296,412 | 1/1967 | Waite et al. ..................... | 219/73 X |

*Primary Examiner*—J. V. Truhe
*Assistant Examiner*—Lawrence A. Rouse
*Attorney*—Kemon, Palmer & Estabrook ABSTRACT: In a method of welding by melting a consumable electrode in a vertical gap between two joint faces, the weld pool being confined by shoes on each side of the gap, a boxlike gas port having an open lower end is placed against the joint face or faces requiring shielding and a shielding gas is passed through the port and is discharged from the open lower end, which extends across the whole width of the joint face. The port may be consumable or may be hoisted as the weld progresses. The consumable electrode or electrodes may be directed towards the joint face or towards opposite joint faces respectively.

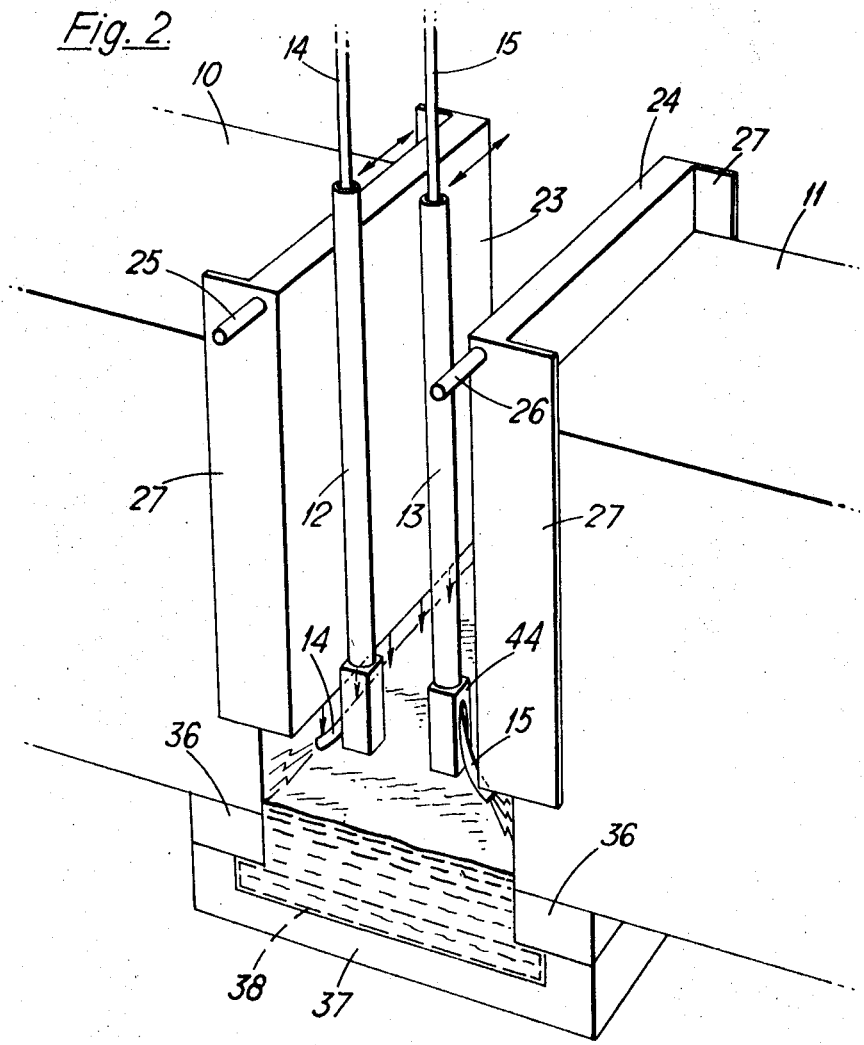
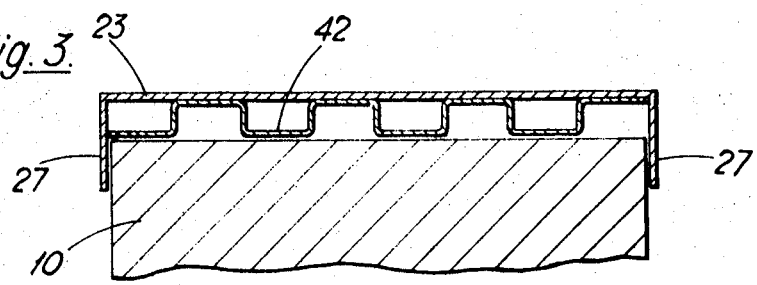

PATENTED OCT 5 1971

Inventor
Peter M Bartlo
By
Kemon, Palmer & Estabrook
Attorneys

ELECTROGAS WELDING

When welding materials of thick section such as aluminum bus bars the high thermal conductivity of aluminum and the mass of the joints make it difficult to get sufficient heat into the joint. In addition because joints must frequently be made in position on site a vertical-welding technique is desirable. The currently used techniques, such as flow welding, the inert-gas metal-arc welding of plates into the joint gap to form a laminated joint, or exothermic welding, are slow and/or expensive. Electroslag and electrogas welding are not satisfactory in the forms in which they exist at present. The problem with these latter processes is lack of fusion with the joint faces.

The method according to the present invention utilizes a vertical welding technique, that is to say a gap between the faces to be joined is arranged to be substantially vertical, a consumable electrode is melted into the gap to form a weld pool, the weld pool being confined by means of shoes bridging the workpieces at each end of the gap, and the weld is formed progressively from the bottom to the top of the gap; in the method according to the present invention, shielding gas is passed through a guiding means adjacent at least one of the said faces to be joined and is released through an aperture or apertures in the lower end face of the guiding means along a line extending substantially the whole width of the workpiece face. For most materials, for example where both workpieces are of aluminum, a gas-guiding means should be positioned along each of the faces to be joined. The gas then flows down each face just above the weld pool and rises in the middle section of the gap between the two faces. In the preferred method of carrying the invention into effect, the guiding means is formed by a boxlike structure against each workpiece face with an open lower end constituting a port extending across the whole width of the face.

These boxlike ports exclude the atmosphere from the whole of the volume immediately above the molten pool and prevent fume from settling on these faces above the arc. Consequently, their presence not only ensures a uniform distribution of shielding gas across the whole width of the joint but also makes it possible to obtain a clean joint. In the preferred method of carrying out the invention, the gas-guiding boxes adjacent the joint faces are left in place and are therefore consumed, that is to say they are melted away as the weld rises progressively up the gap. However, it is also possible to raise these box guides as the weld progresses in a manner analogous to the raising of the filler wire guides in some electroslag-welding processes.

Except where the gap to be filled is a narrow one, we prefer to use two consumable electrodes and to incline them towards opposite work faces so that adequate arc action occurs in the region of the joint faces. By directing the two arcs towards opposite joint faces, we prevent the arcs from coalescing; we also ensure that there is sufficient heat input of the workpieces to obtain good fusion at these faces. Moreover, any surface film which has formed on these faces can be removed by the arc and this also aids fusion between the weld pool and the joint faces. Except for very thin plates (for example ¾-inches thick or less), a lateral-scanning movement is preferably imparted to the electrode guides so that the arcs continuously traverse across the width of the joint faces. In some cases, it is desirable to use two or more spaced electrodes for each joint face.

The use of consumable gas ports avoids the need for coupling lifting equipment to the gas ports and also avoids the need for maintaining close positioning of the gas port on the joint face during its movement. It also has a number of other advantages. With a moving port, the open lower end tends to become blocked by accumulated spatter, especially if this open end is subdivided, as in the case of multichannel ports. With a fixed consumable gas port, the port and any spatter which it has collected fuse and fall into the weld pool as the weld progresses. Due to the intense heating and radiation from the high current arc in the shielding gas, the port becomes very hot. A port that is progressively lifted has to be cooled but water cooling renders the port more bulky and requires a wider separation between the parent workpieces to accommodate the ports. When a consumable port is used no additional cooling is required since the hottest port of the port progressively fuses and drops into the weld pool. In addition, with a consumable port the fume and metal vapor which condenses on the port falls piecemeal into the weld pool as the port melts. Because it enters the weld pool in a piecemeal manner, the debris is subjected to the action of the arc which breaks it down or suitably disperses it. If these products of arcing had condensed on the joint face (in the absence of the boxlike gas port), they would have tended to inhibit the wetting-in of the weld pool on to the parent workpiece.

The boxlike shielding ports may be flat boxes of aluminum and they may contain wire wool, a perforated tube or similar devices to distribute the shielding gas across the whole width of the box. In one form, the shielding ports have internal vertical baffles to assist in directing the shielding gas downwards.

In order that the invention may be better understood, some examples of apparatus for carrying the invention into effect will now be described with reference to the accompanying drawings, in which:

FIG. 2 shows in greater detail the arrangement of the gas-supply boxes with the shoes removed;

FIG. 3 is a cross section through a gas-guiding box;

Figure 1:
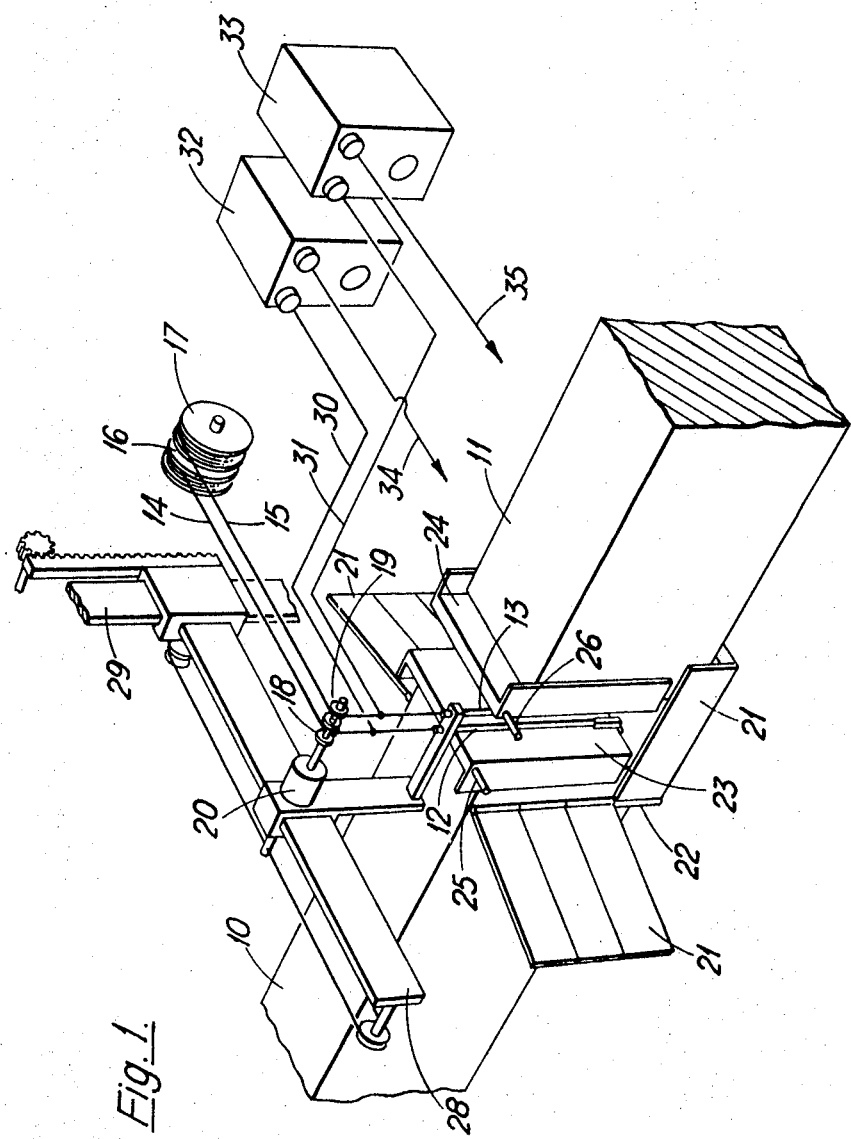
FIG. 1 illustrates diagrammatically a method of carrying out the invention.

In the drawing, the workpieces to be joined are long aluminum bus bars 10 and 11 which are horizontally aligned so that there is a vertical gap between the end faces to be joined. The size of this gap and the thickness of the parts within the gap are exaggerated in the drawings in order to show these parts more clearly.

Two electrode guides 12 and 13 extend vertically down the gap and two consumable electrode wires 14 and 15 drawn from reels 16 and 17 are pushed down the guides by means of rollers 18 and 19 driven by a motor 20. When arcs are struck from the free ends of the electrode wires to the workpiece faces or to a liquid metal pool formed in the gap between these faces, each electrode wire melts and adds to the molten metal. To confine the weld pool to the gap between the workpieces, a "shoe" is arranged vertically on each side of the gap. In the example shown in FIG. 1, on each side of the gap there is a series of shoes 21 which can swing about a post 22. In FIG. 1, the lowermost shoe is in position and it will be seen that it overlaps the workpiece at the two ends of the gap. The shoes are successively brought into position as the level of the weld pool rises. A short time after the commencement of a welding operation, the base of the weld pool begins to solidify and the level of solidified metal then follows the molten liquid level up the gap.

Thin boxlike members 23 and 24 are arranged against the end faces of the workpieces 10 and 11 respectively. The boxlike members have open lower ends and are connected at their upper ends to gas supply tubes 25 and 26. These supply to the boxes a shielding gas (for example, argon) which is discharged through the ports at the lower end of these boxes to shield the workpiece faces between the boxes and the top of the liquid pool. The sides of the boxes are extended (see FIG. 2) to form flanges 27 which run along the side of the workpiece. The flanges help to locate the gas-supply boxes on the workpiece faces and also reduce the escape of the shielding gas as the workpiece face burns back. Either the shoes are constructed with vertically extending spacers or separate spacers, e.g. in the form of steel strips, are used to provide clearance between these shoes and the workpieces for the flanges 27. In the example shown, the boxlike members 23 and 24 are of consumable material so that they need not be hoisted as the weld progresses. Their lower ends burn back progressively and the resulting molten metal adds to the weld pool in the gap.

The free ends of the two electrode wires are deflected towards opposite joint faces so that the arcs are directed towards the joint faces. In this example, the electrode guides are given a traversing movement from side to side of the gap so that the arcs continually traverse the widths of the joint faces. This provides more uniform heating across the width of the joint as well as providing better removal of surface film. The lateral scanning is achieved by mounting the motor 20 and rollers 18 and 19 on a platform which is traversed along a beam 28.

In addition, the electrode guides are progressively hoisted as the level of the weld pool rises and this is effected by a rack and pinion drive which lifts the beam 28 up a vertical beam 29. The guide tubes are of robust construction and may be water cooled.

The electrode wires are electrically connected by way of conductors 30 and 31 to the positive terminals of power sources 32 and 33 respectively. The negative terminals of these power sources are connected by way of earth returns 34 and 35 to the workpieces.

Referring now to FIG. 2, which shows the components within the gap with the shoe removed, to start the process aluminum spacer pieces 36 are placed under each workpiece at the joint face and below this there is placed a tray 37 of a material of lower thermal conductivity than aluminum, for example, steel; within the tray is an aluminum starter plate 38. The starter plate is fused when the arcs are struck and assists in quickly setting up a big molten pool. The spacers 36, which may have a height of about three-fourth inch, also assist in getting the process running smoothly in that they delay the weld pool reaching the bus bar workpieces. It will be appreciated that the workpieces quickly conduct heat away from their joint faces owing to the mass of metal behind these faces. The spacers 36 are not such good heat sinks and consequently abstract less heat from the weld pool in the initial stages. These pacers are not always necessary; for example, if the workpieces were relatively thin and did not constitute good heat sinks, the spacers could be removed.

The parts shown in the drawings are not to scale. In practice, the gap between the workpieces might be between 1½ and 1¾ inches. The gas supply boxes 23 and 24 would have a thickness of about one-eighth of an inch. The electrode wire was of aluminum in the example shown and had a diameter of one-eighth inch. Each wire carried a current of 700 amperes. The rate of flow of argon through each box was about 60 cubic feet per hour and additionally a small amount of argon was made to flow through the guide tubes to prevent air coming down the tubes with the wire. When separate power sources are used for the electrode wires, as in FIG. 1, the driving rolls for the electrode wires may be mounted on the same shaft but the rolls must be insulated from one another and so must the coils of wire. It is possible to run the two wires from the same power source; generally speaking it will then be necessary to form the arcs sufficiently close to one another for them to be mutually ionizing in order to maintain arc stability with the single power source.

The gas supply boxes 23 and 24 of FIGS. 1 and 2 are multichannel ports of castellated construction. A horizontal cross section of the box 23 is shown in FIG. 3. The shaped sheet metal baffle 42 divides the interior of the box into a number of vertical channels on each side of the baffle. The baffle extends a little higher than the level of the top of the workpiece. Above this there may be a metal mesh to assist in distributing across the whole width of the box the gas entering through the tube 25. Alternatively, the box may consist of a bunch of vertical tubes or may be of honeycomb construction.

At the beginning of the weld, the ports at the lower ends of the consumable gas-supply boxes reach almost to the lower ends of the faces to be joined.

When a consumable gas-supply box is used, it should be constructed with material of suitable thickness and of a material which is compatible with the weld metal which is being deposited. For the welding of the aluminum bus bars shown in FIG. 1, the castellated box was of pure aluminum. The thickness of the wall of the box is not critical; however, it should not be so thick as to limit the rate of burning back to such an extent that there is a tendency for the consumable electrode to short circuit excessively onto the box. Conversely, if the box wall were too thin, the radiation would cause the box to burn back a considerable distance above the weld pool, in which case the gas coverage of the joint face above the weld pool would be impaired. For the example shown, we found that it was possible to use a wall thickness between 0.01 inch and 0.06 inch.

During welding, consumable gas-supply boxes tend to burn back to a greater extent at the center than at its extremities. Thus, the box front forms an arch with its extremities closer to the weld pool surface than its central region. We find that this is a desirable condition because the arched form causes the gas to be taken right down into the corners of the space above the weld pool and it then rises out of the center of the weld pool. If the welding conditions are such that the arched shape does not arise naturally, it can be encouraged to occur by making the wall thickness of the outer regions of the box greater than the wall thickness of the central region. For example, the wall thicknesses in the outer regions and in the central region may be 0.03 inch and 0.02 inch respectively. The amount the gas boxes extend above the upper surfaces of the workpieces should be sufficient to ensure that the boxes are still effective to distribute and discharge gas at the end of the weld, when it is usual to provide some additional material above the top of the workpieces to compensate for shrinkage of the weld pool during the final stages of its solidification.

Figure 4:
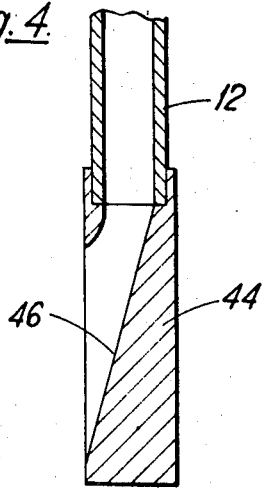
FIGS. 4 and 5 show methods of deflecting the end of the electrode wire.
Figure 5:
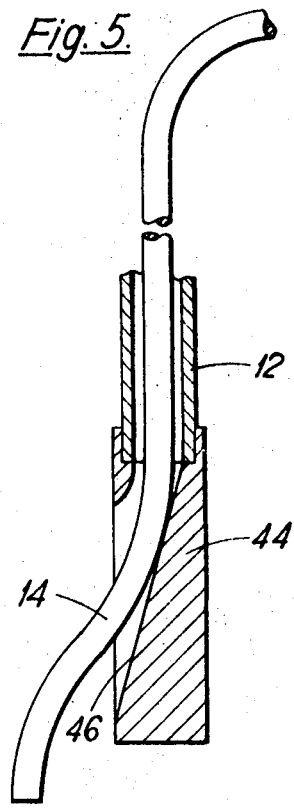

As explained above, it is generally necessary to bring the electrode tip closer to the work face than could be achieved with a vertically extending electrode wire in the presence of the gas ports. With too great a gap between the electrode tip and the joint face, there is a tendency for lack of fusion due to inadequate heating of the work face. For this reason, in the example shown in FIG. 1 we have used two electrode wires and we have deflected them towards opposite work faces. The angle of deflection should not be so steep that the arc bears excessively on the joint face, as this would lead to excessive undercutting, that is to say burning back of the workpiece surface. In normal operating conditions, the wire tip should be maintained not more than about 0.3 inch away from the plane of the joint face before undercutting and the tip should not be allowed to extend more than 0.5 inch into the undercut. The required inclination of the aluminum wire with respect to the work face can be introduced by angling the exit surface of the guide tip, as shown in FIG. 4. In this figure, the guide tube 12 terminates in a tip 44 which has an inclined surface 46. An electrode wire passing through the guide 12 strikes the inclined face 46 and is deflected away from the vertical. Additionally, or alternatively, the wire may be given an initial plastic deformation, such that it continues to curve after leaving the guide tip. The plastic deformation may add to the inclination produced by the surface 46 or it may have effect in the opposite direction to produce an approximate "S" shape in the electrode extension, as shown in FIG. 5. To more readily position the wire tip as required with respect to the joint face without excessive curvature of the wire, we prefer to use relatively large electrode extensions of the order of 1¾ inches. Typically, the angular deflection is in the range of 5° to 25° away from the vertical. Excessive deflection of the wire should be avoided in order to prevent the wire tip from curving round and penetrating into an undercut zone and thereby increasing the undercut. The preferred range of deflection is between 7° and 12° from the vertical. With such an inclination, the arcs from the wires may just catch the edge of the starter plate at the beginning of the process. However, even if they do not they will melt metal from the spacers 36 and this will fall on to the starter plate and will melt the latter.

For workpieces of small height, or in a system in which the electrode guides enter the gap from the side and are of small vertical height, instead of deflecting the ends of electrode wires emerging from vertical guide tubes, oblique guide tubes can be used without tip deflection to bring the electrode wire tips to the correct distance from the joint faces.

Instead of the succession of swinging shoes 21 shown in FIG. 1, a single shoe can be used on each side of the gap, this shoe being progressively hoisted in a manner known from electroslag welding. The hoisting is controlled so that the bottom of the shoe always lies against the solidified portion of the workpiece and the top of the shoe always lies sufficiently above the level of the weld pool to ensure adequate gas cover.

Figure 6:
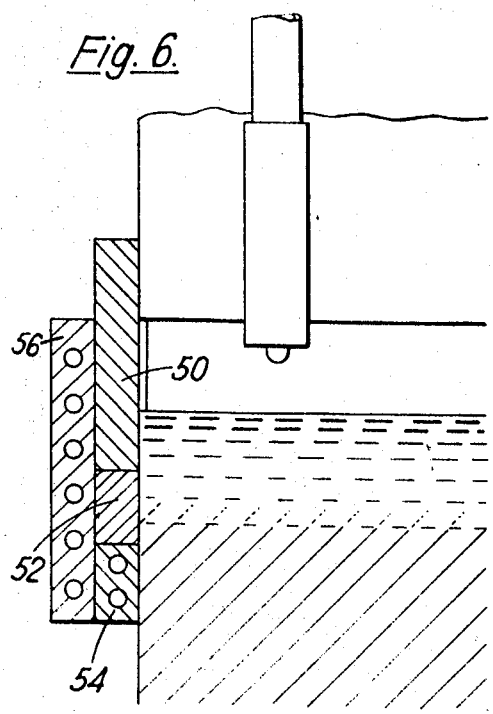
FIG. 6 illustrates the arrangement and construction of the shoes.

The shoes used to confine the weld pool are preferably water cooled (when a large weld pool exists) to prevent damage to the shoes themselves and to aid the solidification of the molten pool as the pool progresses vertically. On the other hand, it is also desirable to maintain a sufficiently deep pool to aid the wetting-in of the joint face and effusion of dissolved gases. For this reason, when we use a single climbing shoe on each side, we prefer the shoes to be so constructed that they constitute a differential heat sink from top to bottom. This can be attained by constructing the shoes with different degrees of water cooling or by using materials of different thermal conductivities or both. To minimize heat loss and to avoid undesirable alloying of the shoe face with the molten pool, it is desirable to employ a relatively inert material, for example carbon. The shoe shown in FIG. 6 has a carbon upper section 50 for contact with the molten pool, a solid copper intermediate section 52 and a water-cooled copper lower section 54. The shoe is backed by a water-cooled copper plate 56.

The upper part of the shoe is preferably of a material which does not promote arcing, particularly in view of the fact that the electrode tip traverses the joint face and comes into close proximity with the shoe. Metal-face shoes with a low work function or for which the cathode voltage is low compared with the weld pool are unsuitable since there is a tendency for the arc to transfer on to the shoe and cause excessive pitting or other damage. Materials should, therefore, be used which have high work function (as thermionic emitters) or a high-cathode voltage (as field emitters) in order to avoid excessive interaction with the electrode gas arc.

If the power sources have a drooping characteristic, adequate capacity is required in order to avoid permanent short circuiting. If on the other hand the power sources have a flat characteristic, then some impedance may have to be inserted to avoid erratic arc behavior.

We have described a process in which aluminum is welded to aluminum. However, the process can also be used for other metals and for joints between metals only one of which is of high thermal conductivity. For example, it can be used in the joining of copper to steel. In such a case, it may not be necessary to cover the steel joint face with a gas-supply box and the gas used for copper face could be nitrogen. For some dimensions of these workpieces, a single arc directed on to the copper workpiece will suffice; if a second arc is required it can be arranged vertically.

Another case in which one of the arcs can be used without deflection on to the workpiece is when a thick section is being welded to a thin section. It may not be advisable in such a case to deflect an arc on to the thin section.

I claim:

1. A method of welding together workpieces by arranging that a gap between the faces to be joined is substantially vertical, melting a consumable electrode to form a weld pool in the gap and confining the weld pool by means of shoes bridging the workpieces at each end of the gap, the weld being formed progressively from bottom to top of the gap, comprising the steps of:

placing against at least one of the faces to be joined a gas-guiding means, said gas-guiding means extending from side to side of said workpiece face and being open at its lower end across substantially the whole width of said workpiece face;

and passing shielding gas through said guiding means and releasing it through said open lower end, whereby above said open lower end said workpiece face is covered by said gas-guiding means and between said open lower end and the weld pool the workpiece face is shielded by said released gas.

2. A method as defined in claim 1, comprising directing the tip of said consumable electrode fed into the gap towards the face of one of said workpieces below said gas-guiding means against said workpiece face.

3. A method as defined in claim 1, comprising feeding two consumable electrodes into said gap and directing the tips of said electrodes towards opposite workpiece faces.

4. A method as defined in claim 1, in which a gas-guiding means is placed against each of the faces to be joined and gas is released through the open lower face of each gas-guiding means, the method comprising feeding two consumable electrodes into said gap and directing the tips of said two electrodes towards opposite workpiece faces below said gas-guiding means.

5. A method as defined in claim 2, comprising feeding said consumable electrode through a substantially vertical guide within said gap and deflecting the tip of said consumable electrode emerging from said guide towards said workpiece face.

6. A method as defined in claim 5, in which the angle or deflection is between 5° and 25° from the vertical.

7. A method as defined in claim 6, in which the angle of deflection is between 7° and 12° from the vertical.

8. A method as defined in claim 1, in which said gas-guiding means is fixed in place and is consumed as the weld progresses.

9. A method as defined in claim 1, comprising, prior to the commencement of the weld, placing said workpiece ends to be joined over a starter plate resting in a tray of material of lower thermal conductivity than said starter plate, whereby the starter plate is melted at the beginning of the welding operation.

10. A method as defined in claim 9, comprising, prior to the commencement of the weld, placing spaces between said workpiece faces and said starter tray, whereby the weld pool is deeper when it reaches the lower surface of the workpieces and the heat sink effect of the workpieces on the weld pool is delayed.

11. Apparatus for welding together workpieces positioned with a vertical gap between the faces to be joined, comprising:

shoes for bridging said gap on each side of said workpieces to confine a weld pool between the workpiece faces;

a hollow boxlike gas-guiding means for placing against at least one of the faces to be joined, each gas-guiding means having a gas-inlet tube at its upper end and having an open lower end constituting a gas outlet;

and an electrode guide for guiding a consumable electrode wire into the gap.

12. Apparatus as defined in claim 11, in which said gas-guiding means is internally divided into a number of vertical channels and has lateral flanges which, when said workpiece is in place, extend along the sides of the workpiece.

13. Apparatus as defined in claim 11, in which said gas-guiding means is to be consumed during the welding operation and in which the wall of said gas-guiding means is thicker along the outer vertical portions of said gas-guiding means than in the central region between said outer portions, whereby the lower end of said gas-guiding means burns back to form an arch.

14. Apparatus as defined in claim 11, wherein said electrode guides terminate in tip portions having inclined exit surfaces for deflecting said electrode wire towards the work faces.

15. Apparatus as defined in claim 11, in which each shoe is constructed with upper and lower portions, said lower portion having better heat-absorbing properties than said upper portion.

16. Apparatus as defined in claim 15, in which the top of each shoe is formed of carbon and the bottom of each shoe is of copper and includes cooling channels.

17. Apparatus as defined in claim 11, including traversing means for imparting to said electrode guides an oscillating transverse movement, whereby arcs from said electrode wires will scan across said workpiece faces.

18. A method of welding together workpieces by arranging that a gap between the faces to be joined is substantially vertical, melting a consumable electrode to form a weld pool in the gap and confining the weld pool by means of shoes bridging the workpieces at each end of the gap, the weld being formed progressively from bottom to top of the gap, the method comprising the steps of:

fixing against each of the faces to be joined a consumable boxlike gas-guiding means, each gas-guiding means extending from side to side of said workpiece face against which it is fixed and being open at its lower end across substantially the whole width of the workpiece face;

passing a shielding gas through each gas-guiding means and discharging it through said open lower end, whereby each workpiece face is covered above its lower end by the gas-guiding means and is shielded between said lower end of the gas-guiding means and said weld pool by said discharged shielding gas;

feeding two consumable electrode wires into said gap;

directing the tips of said two electrode wires towards opposite workpiece faces below said guiding means;

and striking arcs from said tips towards said opposite workpiece faces.